3,542,712
COATING COMPOSITION OF ETHYLENE-VINYL ACETATE COPOLYMER AND ARTICLES COATED THEREWITH
Bert Sorelle Gorton, Kennett Square, Pa., and Paul Edward Sample, Wilmington, Del., assignors to E. I. du Pont de Nemours and Company, Wilmington, Del., a corporation of Delaware
No Drawing. Filed Jan. 5, 1968, Ser. No. 695,840
Int. Cl. C08f 37/18
U.S. Cl. 260—23                                                     8 Claims

ABSTRACT OF THE DISCLOSURE

A moisture insensitive and heat-sealable coating composition is provided which comprises an aqueous dispersion of an ethylene/vinyl acetate copolymer, wax, a wood rosin ester and hydrolyzed polyvinyl acetate.

---

The present invention relates to a coating composition and articles of manufacture prepared therewith. More particularly, the present invention is directed to coating compositions of an ethylene-vinyl acetate copolymer, a wood rosin ester and hydroylzed polyvinyl acetate, and to self-supporting film structures comprising a base film coated therewith.

Coating compositions of ethylene-vinyl acetate copolymers useful, for example, for coating base film structures such as transparent regenerated cellulose, are well known. To illustrate, U.S. Pat. 3,232,789 describes the coating of polypropylene film structures with a solvent composition of ethylene-vinyl acetate copolymer, wax and rosin esters. Also, British Pat. No. 950,406 describes coating polypropylene film with an ethylene-vinyl acetate-wax-rosin derivative composition applied via organic solvent, hot melt and aqueous dispersions. Additionally, Canadian Pat. No. 747,875 describes an aromatic solvent applied ethylene-vinyl acetate copolymer/wax/rosin coating on a polymeric film such as polypropylene. Such laminar or coated film structures are desirable for use as packaging materials because characterized by a unique combination of physical properties such as heat sealability, good barrier performance in respect to protection against permeation of water vapor or undesired gases as well as residence of the structure to permeation of greases and the like.

An important objective in the adaption of polymeric film structures such as biaxially oriented polypropylene films for the packaging trade has been to provide for heat sealing of the film at a temperature below which desired properties of the film are not degraded. Such coated products must not only be readily heat sealable but they must also be free from such objectionable features as blocking and loss of adherability when subjected to moist atmospheres.

Coating compositions applied from an organic solvent tend to be less subject to moisture sensitivity but solvent application of coatings on hydrophobic polymeric films suffers the disadvantage of requiring solvent recovery. Furthermore, difficulty is encountered in preventing static accumulation by the film structure during the coating operation and in removing thoroughly the organic solvent from the coated film structure. Application of appropriate coatings from an aqueous dispersion substantially obviates these difficulties but coated products from such applications tend to be moisture sensitive, that is, the coatings lose their adherability to the base layer when subjected to moist atmospheres. It is, therefore, the principal object of the present invention to provide aqueous coating compositions based upon ethylene-vinyl acetate copolymers that are substantially water-insensitive. It is a further object of the present invention to provide an aqueous dispersion coated polymeric film characterized by ready heat sealability, moisture resistant adherability and freedom from blocking.

According to the present invention there is provided a composition comprising an aqueous dispersion of between about 30 and about 40 parts by weight, based upon the total composition weight, of an ethylene/vinyl acetate copolymer having an ethylene content of 70% to 85% by weight, based upon the copolymer weight; between about 20 and about 25 parts by weight of a wax having a melting point of at least 60° C.; between about 1 and about 10 parts by weight of a polyvinyl acetate resin hydrolyzed to the extent between about 85% and about 95%; between about 30 and about 40 parts by weight of a rosin ester; between about 0.5 and about 5 parts by weight of a stearate salt of a metal selected from Group II of the Periodic Arrangement of The Elements (Lange's Handbook of Chemistry, 7th edition, 1949, pages 56 and 57, Handbook Publishers, Inc.) and having an atomic number between 12 and 30, and between about 0.1 and about 10 parts by weight of a particulate having a particle size ranging between about 0.5 and about 10 microns.

According to the present invention there is further provided a moisture-resistant and heat-sealable film structure comprising a base film of organic polymeric material having firmly adhered to at least one surface thereof a coating comprising, based upon the total coating weight, between about 30 and about 40 parts by weight of an ethylene-vinyl acetate copolymer having an ethylene content of 70 to 85% by weight, based upon the copolymer weight; between about 20 and about 25 parts by weight of a wax having a melting point of at least 60° C.; between about 1 and about 10 parts by weight of a polyvinyl acetate resin hydrolyzed to the extent of about 85% to about 95%; between about 30 and about 40 parts by weight of a rosin ester; between about 0.5 and about 5 parts by weight of a stearate salt of a metal selected from Group II of the Periodic Arrangement of The Elements and having an atomic number between 12 and 30; and between about 0.1 and about 10 parts by weight of a particulate having a particle size ranging between about 0.5 and about 10 microns. The moisture-resistant and heat-sealable film structure of the present invention preferably comprises a base layer of polypropylene.

The nature and advantages of the composition and coated film structures of the present invention will be more clearly understood from the following description thereof.

The composition of the present invention includes an ethylene-vinyl acetate copolymer. The copolymer for purposes of the invention contains between about 70% and about 85% by weight, based upon the total weight of the copolymer, of ethylene, and between about 15% and about 30% by weight, based upon the total weight of the copolymer, of one or more unsaturated esters of a carboxylic acid copolymerizable therewith. Representative suitable unsaturated esters of a carboxylic acid copolymerizable with ethylene include, for example: vinyl acetate, isobutyl acrylate and ethyl acrylate. Particularly preferred unsaturated esters include vinyl esters such as vinyl acetate.

The copolymer of the present invention is synthesized as an organosol in a solvent such as cyclohexane using in accordance with the procedure described in U.S. Pat. No. 3,347,811. A typical copolymer, for example, contains 81–83 parts of ethylene, 17–19 parts of vinyl acetate. The copolymer of the invention is characterized by a melt index between about 1 and about 100.

The wax component of the composition of the invention includes, for example, paraffin waxes, micro-crystalline wax, natural and synthetic waxes. llustrative waxes include such paraffin waxes as the Aristowax[4], carnauba, ouricouri and candelilla waxes, microcrystalline waxes such as Micro Wax[1], Be-Square-[2] or Petrowax A[3] and synthetic wax such as hydrogenated castor oil (Opal wax). The wax should have a melting point of at least 60° C.

The hydrolyzed polyvinyl acetate resin utilized in the composition of this invention is one having a degree of hydrolysis of about 85% to about 95%.

The rosin ester utilized in the composition of the present invention includes esters derived from glycerol, ethylene glycol and similar polyhydric alcohols of rosin acids. The acid number of the ester composition is below about 30. Particularly suitable rosin esters are the glycerol ester of polymerized wood rosin acid ("Poly-pale" Resin) and the glycerol ester of hydrogenated wood rosin ("Staybellite Ester" 10) or a modified ester (Dresinol 155F) sold by Hercules, Inc. The esters can be used singly or a combination of two or more can be employed.

The metal stearate component of the composition of the present invention is that of a metal selected from Group II of the Periodic Table having an atomic number between 12 and 30 such as, for example, calcium, magnesium and zinc. The metal stearate is present in the composition in an amount between about 0.5 and about 5 parts by weight, based upon the total weight of the composition.

The particulate material utilized in the composition of the present invention includes that of, for example, mica, vinyl chloride polymers, clays such as bentonite, and talcs such as steatite talc. The particulate material is characterized by a particle size or average diameter of between about 0.5 and about 10 microns, and is present in the composition in an amount between about 0.1 and about 10 parts by weight, based upon the total weight of the composition.

The preferred embodiment of the composition and film of the present invention comprises the ethylene/vinyl acetate copolymer coated on a biaxially oriented polypropylene film. The preferred ethylene/vinyl acetate copolymer is one containing about 78 to 82% of ethylene and having a melt index in the range of 2–20. A paraffin wax is preferred. The preferred hydrolyzed polyvinyl acetate resin is one having a degree of hydrolysis between 87% and 89% and having a viscosity in the range of 35 to 45 centipoises at 20° C. in a 4% solution. The preferred particulates are those based on polyvinyl chloride and steatite talc.

The aqueous coating dispersions of the present invention are prepared by dissolving the ethylene/vinyl acetate copolymer, the wax and the rosin ester in a solvent mixture such as isopropanol and cyclohexane or toluene, adding to this mixture a solution of the hydrolyzed polyvinyl acetate in water and thereafter emulsifying the mixture by passing it through a colloid mill. The resulting emulsion is concentrated to remove the organic solvents substantially and to increase the solids content of the aqueous dispersion to the range of 20% to 60% solids. This dispersion is then mixed with a stearate salt such as calcium stearate and a particulate such as polyvinyl chloride or talc. The resulting aqueous dispersion is coated on the polymeric film by methods known in the coating art. The thickness of coating is generally in the range of 0.5 to 6 grams per sq. meter and may in some applications be as high as 10 grams or more per sq. meter.

According to the present invention there is further provided a moisture-resistant and heat-sealable film structure comprising a base film of organic thermoplastic polymeric material, preferably polypropylene, having firmly adhered to at least one surface thereof a coating comprising the composition described hereinabove. The polypropylene film may be prepared in accordance with the method described in U.S. Pat. 3,141,912. The base film is preferably treated before being coated by any one of known techniques to enhance the surface receptivity or adherability thereof. For instance, polypropylene may be treated by subjecting the surface thereof to be coated to the action of a burning gaseous flame characterized by a fuel equivalence ratio of about 1.04 and an oxygen ratio of about 0.29 while traveling over a rotating cylinder having a surface temperature of about 50° C. The base film is coated with the above described composition by any convenient coating technique.

The principle and practice of the present invention will now be illustrated by the following example which is provided to show the practice and use thereof, but it is not intended that the invention be limited thereto since modifications in technique and operation will be apparent to anyone skilled in the art. All parts and percentages in the following example are by weight unless otherwise indicated.

The test samples of coated film structures prepared in the following example were evaluated in accordance with the following testing procedures:

Haze: The haze test was conducted in accordance with the procedure described in ASTM–D1003–59T.

Heat seal: Heat seal strength is measure by cutting a piece of the coated film, 4" x 10", into two pieces, 4" x 5" each, with the long direction being in the direction of extrusion (usually called the machine direction) of the polymeric material constituting the base film. These two pieces are then superimposed in a manner so that the coated surfaces are in contact. The two pieces of superimposed film are then sealed together at each end at right angles to the machine direction axis. The films are sealed under the specified conditions of pressure, dwell time and temperature. The sealed films are cut in half at right angles to the machine direction axis, and strips of one inch width are cut from the latter parallel to the machine axis to provide the test samples which are evaluated. The test samples are conditioned as specified, and tested by placing the free ends of the strips in a Suter Tester Machine and pulling them apart. The highest force in grams required to pull the strips apart is taken as a measure of the actual heat-seal bond strength.

Peel test: Peel strength is measured by attempting to lift the coating from the base film with a sharp edged instrument such as a knife. If the coating cannot be lifted without rupture of the coating itself, the bond is labelled "No Peel." If the coating can be lifted, a one inch wide strip of adhesive tape is attached to the loosened strip which is then pulled off at an angle of 180°. The bond so obtained is labelled "Can Peel" or the actual force required to pull off the strip of coating is recorded.

Blocking: For this test 15 to 20 sheets of 4" x 4" base film specimens are piled in a sstack front to back. The stack is placed between two 4" x 4" sheets of chipboard and wrapped to form a package in waxed kraft paper. The package is then placed on a smooth sheet of metal at least $\frac{1}{16}$ in. thick and approximately 6" square.

---
[1] Quaker State Oil Refining Corp.
[2] Bareco Oil Co.
[3] Gulf Refining Co.
[4] Union Oil Co.

A 4" x 4" lead weight with a smooth face and having a weight of 25 lbs. (1.5 lb./sq. in.) is accurately placed on the package of sheets, and the entire assembly is placed in an oven maintained at the specified temperature for 16 hours. The package of sheets is removed from the oven and allowed to cool to room temperature (one hour or more). The cooled paskage of sheets is carefully unwrapped, the chipboard removed, and the stack of sheets grasped by thumb and forefinger, care taken to avoid bending the stack or disturbing its edges. The stack is graded as follows:

Grade 1—the sheets slide part individually with no tendency whatever to cling together.
Grade 2—the stack separates into 2 or more groups of sheets which remain moderately firmly matted together.
Grade 3—the stack cannot be separated by straight shearing force and can be separated only by peeling the sheets apart.

Films with Grade 1 blocking are preferred. Films with Grade 2 can be used. Films with Grade 3 blocking are unsatisfactory for many uses.

Odor: The odor test is conducted by placing 0.1 m.² pieces of coated film in individual one quart Mason Jars. The jar openings are covered with sheets of 50 gauge polyethylene terephthalate film sheets. The jars are stored for 18 hours at about 25° C., after which the jars are opened and the odor ratings are determined by a panel of at least three experienced odor testers. Each tester checks at least two sample bottles. The ordor ratings are as follows:

Rating 1—no detectable odor
Rating 2—slight odor, but not objectionable
Rating 3—moderate odor, not especially objectionable
Rating 4—strong odor, definitely objectionable A film with a rating of 1 or 2 is acceptable, one with a rating of 3 may be acceptable for some purposes but not for the wrapping of especially odor sensitive products such as tobacco. Film having a rating of 4 is definitely unacceptable.

EXAMPLE

Following essentially the procedure outlined in U.S. Pat. 3,347,811, 8.4 parts of a paraffin wax ("Aristowax" 143–150° F., Union Oil Co.), 12.4 parts of ethylene/vinyl acetate copolymer resin (72% by weight ethylene content, melt index, 6 g./10 min., ASTM 1238) and 12.7 parts of "Polypale Ester" 10 (glyceryl ester of polymerized rosin acid, Hercules, Inc.) are dissolved in 51 parts of toluene and 14 parts of isopropanol by agitating in a colloid mill. To this is added a solution of 16.5 parts of a 10% solution of hydrolyzed polyvinyl acetate ("Elvanol" 50–42, Du Pont Co.) in 72.5 parts of demineralized water and the composite agitated for 5 minutes to form an aqueous dispersion. The dispersion is concentrated to bring the solids content to the desired range and to remove the organic solvents, desirably to a level below 0.5%.

A coating dispersion of approximately 35% solids is made from the dispersion described above containing 35 parts of the ethylene/vinyl acetate copolymer, 24 parts of paraffin wax, 36 parts of "Polypale Ester" 10, and 5 parts of hydrolyzed polyvinyl acetate, 3 parts of calcium stearate and 0.25 part of Geon 126 (Polyvinyl chloride particulates, B. F. Goodrich Co.) and applied to an 0.8 mil thick, oriented, flame treated polypropylene film and dried. The coated film carrying 1.6 grams per square meter of coating shows "no peel" values (coating can not be peeled from base layer) after 16 hrs. immersion in water at 45° C. or after 5 hrs. in boiling water. The coated film seated to itself at 5 p.s.i. and ⅛ second dwell time shows heat seal values of 115 g./in. and 183 g./in. when cealed at 70° C. and 100° C., respectively. A similar coated film carrying 3.5 grams per square meter of coating shows heat-seal values of 121 g./in. at 70° C. and 221 g./in. at 100° C. The test films show a blocking grade of 2 when tested at 63° C. with the coated surface to coated surface or when tested with the coated surface to an opposite uncoated surface. The test films show an odor rating of 1.

For comparisons, flame treated polypropylene films coated respectively with the coating compositions described above except that the hydrolyzed polyvinyl acetate was replaced by (1) sodium oleate and by (2) sodium rosinate show substantially no adhesion in the water immersion test at 45° C. and in boiling water.

The test films described above serve as excellent base layers for application of coatings such as those of the vinylidene chloride copolymers to form well adhered coated products. The test films can be laminated to other structures such as vinylidene chloride copolymer coated cellophane films, to metal foils and foil surfaced structures, to plastic films and to paper to provide firmly bonded, highly useful laminar structures.

In addition to their use on polypropylene films, the coating compositions of this invention can be applied on other polymeric films such as those of polymers and copolymers of ethylene, vinyl chloride, vinyl fluoride and styrene as well as on oriented and non-oriented films of alkylene terephthalate and isophthalate polymers and copolymers.

What is claimed is:

1. A composition comprising an aqueous dispersion of, based upon the total composition weight, between about 30 and about 40 parts by weight of an ethylene/vinyl acetate copolymer having an ethylene content of 70% to 85% by weight, based upon the copolymer weight; between about 20 and about 25 parts by weight of a wax having a melting point of at least 60° C.; between about 1 and about 10 parts by weight of a polyvinyl acetate resin hydrolyzed between about 85% and about 95%; between about 30 and about 40 parts by weight of a rosin ester; between about 0.5 and about 5 parts by weight of a metal salt of a stearate, said metal selected from Group II of the Periodic Table and having an atomic number between 12 and 30; and between about 0.1 and about 10 parts by weight of a particulate having a particle size ranging between about 0.5 and about 10 microns.

2. The composition of claim 1 wherein said wax is a paraffin wax having a melting point of at least 60° C.

3. The composition of claim 1 wherein said ethylene/vinyl acetate copolymer has an ethylene content of 78 to 82%.

4. The composition of claim 1 wherein said polyvinyl acetate resin is hydrolyzed between about 87% and 89%.

5. The composition of claim 1 wherein said rosin ester is an ester of polymerized rosin acids derived from polyhydric alcohols wherein the acid number of said ester is below about 25.

6. The composition of claim 1 wherein said particulate is polyvinyl chloride, mica, clay or talc.

7. An article of manufacture of a moisture resistant and heat-sealable, self-supporting film structure comprising a base film of organic polymeric material having firmly adhered to at least one surface thereof a coating comprising, based upon the total coating weight, between about 30 and about 40 parts by weight of an ethylene/vinyl acetate copolymer having an ethylene content of 70% to 85% by weight, based upon the copolymer weight; between about 20 and about 25 parts by weight of a wax having a melting point of at least 60° C.; between about 1 and about 10 parts by weight of a polyvinyl acetate resin hydrolyzed between about 85% and about 95%; between about 30 and about 40 parts by weight of a rosin ester; between about 0.5 and about 5 parts by weight of a metal salt of a stearate, said metal selected from Group II of the Periodic Table and having an atomic number between 12 and 30; and between about 0.1 and about 10 parts by weight of a particulate having a particle size ranging between about 0.5 and about 10 microns.

8. The article of claim 7 wherein said base film is polypropylene.

References Cited

UNITED STATES PATENTS 3,057,756  10/1962  Cornwell _____ 117—145
3,239,484  3/1966   Stark _____ 260—23 XR
3,355,322  11/1967  Worrall et al. _____ 260—897 XR

FOREIGN PATENTS 950,406  2/1964  Great Britain.

DONALD E. CZAJA, Primary Examiner

D. J. BARRACK, Assistant Examiner

U.S. Cl. X.R.

117—138.8, 161, 167; 260—27, 28.5, 29.6, 33.4, 33.6, 41, 87.3, 89.7, 89.9